Nov. 27, 1945.    R. TYLER    2,389,829
REMOTE CONTROL
Filed Sept. 15, 1944    2 Sheets-Sheet 1
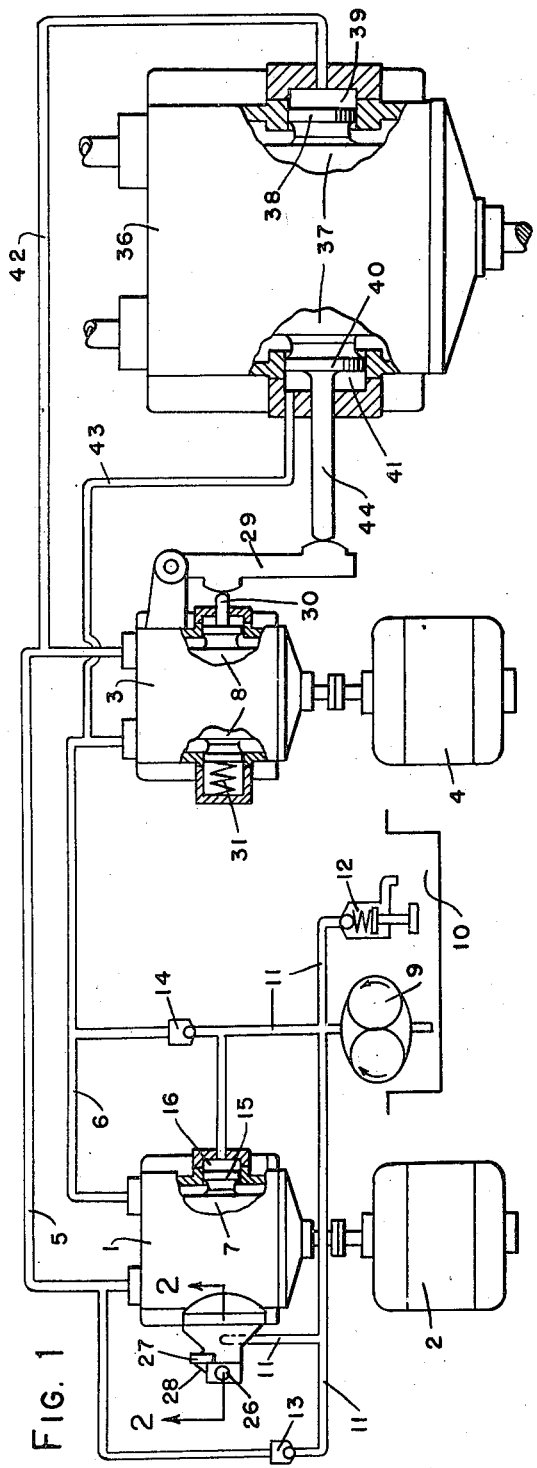
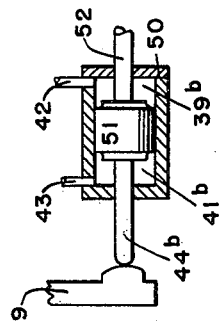
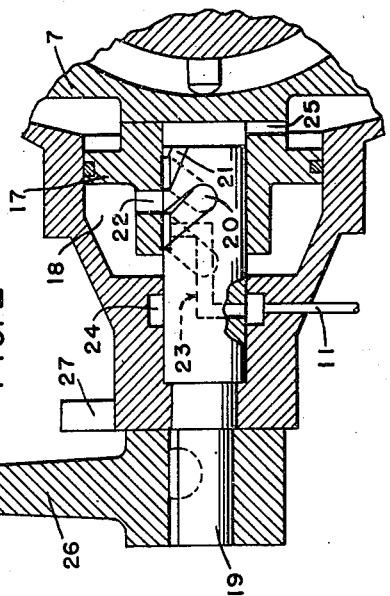
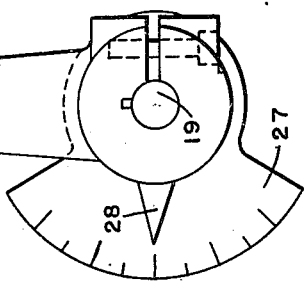
INVENTOR
RANSOM TYLER
BY
*Wesley P Merrill*
ATTORNEY Nov. 27, 1945.   R. TYLER   2,389,829
REMOTE CONTROL
Filed Sept. 15, 1944   2 Sheets-Sheet 2

INVENTOR
RANSOM TYLER
BY
ATTORNEY

Patented Nov. 27, 1945

2,389,829

UNITED STATES PATENT OFFICE 2,389,829

REMOTE CONTROL

Ransom Tyler, Greenfield, Wis., assignor to The Oilgear Company, Milwaukee, Wis., a corporation of Wisconsin Application September 15, 1944, Serial No. 554,308

15 Claims. (Cl. 60—97)

This invention relates to controls of the type employed to control the movement of an element from a remote point and it has as an object to provide a control by means of which an element beyond the range of the vision of an operator may be moved through the distance or to the point selected by the operator.

Another object is to provide a control by means of which the movement of an element may be accurately controlled from a remote point.

Another object is to provide a control which will maintain the controlled element in its adjusted position.

These and other objects and advantages will be apparent from the following description of an embodiment of the invention shown schematically in the accompanying drawings in which the views are as follows:

Fig. 1 is a diagrammatic view of a control embodying the invention and employed to control the displacement of a hydrodynamic machine.

Fig. 2 is a view showing the mechanism for adjusting one of the pumps forming a part of the control, the view being taken substantially on the line 2—2 of Fig. 1 but with certain parts broken away.

Fig. 3 is an end view of the control shown in Fig. 2.

Fig. 5 is a view showing how the control may be applied to a simple hydraulic actuator.

Figure 4:
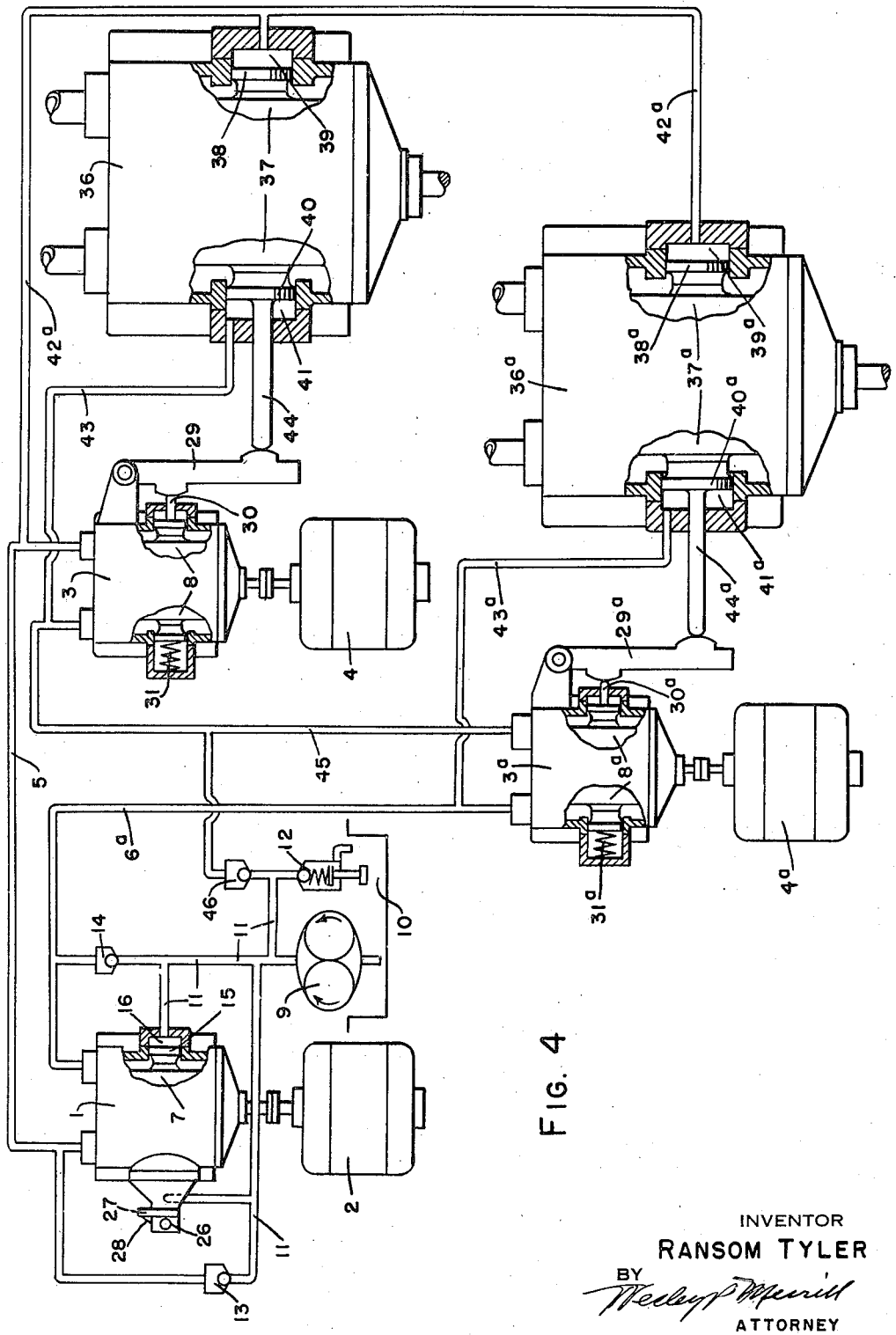
Fig. 4 is a diagrammatic view showing the control employed to control a plurality of hydraulic actuators or hydrodynamic machines.

The control shown in Fig. 1 includes a small variable displacement transmitter pump 1 which is driven at a constant speed by an electric motor 2, a small variable displacement receiver pump 3 which is driven at a constant speed by an electric motor 4, and two channels 5 and 6 which connect pumps 1 and 3 in a closed hydraulic circuit. The speeds and displacements of pumps 1 and 3 are so proportioned that both pumps deliver liquid at the same volumetric rate at any given adjustment so that a variation in the rate of delivery of one pump relative to the rate of delivery of the other pump will cause a variation in the flow in one side of the circuit relative to the flow in the other side thereof and such variation in flow is utilized to effect operation of a hydraulic actuator which in turn adjusts the displacement of the receiver pump to equalize the flow in the two sides of the circuit. Preferably, pumps 1 and 3 have the same volumetric capacity and are driven at the same speed.

Pumps 1 and 3 include, respectively, displacement varying members or slide blocks 7 and 8 which are shiftable to vary the displacements and volumetric deliveries of the pumps, the rate at which each pump delivers liquid being substantially proportional to the distance the slide block thereof is offset from its neutral position. Pumps 1 and 3 may be unidirectional and the actuator may be caused to move through its entire range in response to the slide block of the transmitter pump being moved from neutral toward full displacement position but preferably the pumps are reversible, so that each pump delivers liquid in a direction dependent upon the direction its slide block is offset from its neutral position, and the actuator is caused to move in one direction or the other in response to the slide block of the transmitter pump being shifted in one direction or the other.

Pump 1 may be provided with any suitable control such as the well known Oilgear DH control an example of which is illustrated and described in Patent No. 2,114,005. Liquid for energizing the control is supplied by a gear pump 9 which may be driven in unison with one of the pumps and arranged in the casing thereof according to the usual practice but which has been shown as a separate pump and as drawing liquid from a separate reservoir 10. Gear pump 9 discharges its output into a branched supply channel 11 having connected thereto a low pressure relief valve 12 through which liquid discharged by gear pump 9 in excess of requirements is exhausted and which enables gear pump 9 to maintain a constant pressure in channel 11. Gear pump 9 is also employed to make up leakage losses in the hydraulic circuit and to maintain pressure therein. To this end, supply channel 11 is connected to channels 5 and 6 through two check valves 13 and 14 which permit liquid to flow from channel 11 into either of channels 5 and 6 but prevent flow in the opposite direction.

The DH control includes a piston 15 which engages slide block 7 and is fitted in a stationary cylinder 16 to which a branch of supply channel 11 is connected so that piston 15 constantly urges slide block 7 toward the left. Slide block 7 is adapted to be moved toward the right by a piston 17 (Fig. 2) which engages slide block 7 and is fitted in a cylinder 18 carried by the casing of pump 1. The flow of liquid to and from cylinder 18 is controlled by a rotary pilot valve 19 which is fitted in coaxial bores formed in and extending through piston 17 and the head of cylinder 18.

Valve 19 has two spiral grooves 20 and 21 formed in its peripheral surface upon opposite sides of a port 22 which is formed in the hub of piston 17 and provides communication between cylinder 18 and one or the other of grooves 20 or 21 when valve is rotated in one direction or the other. A passage 23 formed in the interior of valve 19 connects groove 20 to an annular port 24 which is formed in the head of cylinder 18 around valve 19 and has a branch of supply channel 11 connected thereto. Groove 21 communicates with the inner end of the bore in piston 17 which is drained into the casing of pump 1 through a drain passage 25.

The arrangement is such that, when valve 19 is rotated in a counterclockwise direction in respect to Fig. 3, groove 20 will open to port 22 and then liquid will flow from supply channel 11 through port 24, passage 23, groove 20 and port 22 into cylinder 18 and cause piston 17 to move slide block 7 toward the right for the reason that piston 17 has a greater effective pressure area than piston 15.

Piston 17 will start to move as soon as groove 20 opens to port 22 and it will continue to move during rotation of valve 19 but, as soon as rotation of valve 19 ceases, port 22 will move out of communication with groove 20 and movement of piston 17 and slide block 7 will cease.

When valve 19 is rotated in the opposite direction, groove 21 will open to port 22 and, since groove 21 is at all times open to drain, piston 15 will move slide block 7 toward the left and cause piston 17 to expel liquid from cylinder 18 through port 22, groove 21, the bore in piston 17 and drain passage 25 into the casing of pump 1.

Slide block 7 will start to move as soon as groove 21 opens to port 22 and it will continue to move during rotation of valve 19 but, as soon as rotation of valve 19 ceases, port 22 will move out of communication with groove 21 and trap the remaining liquid in cylinder 18, thereby stopping further movement of slide block 7 and holding it in adjusted position. Slide block 7 may thus be moved in one direction or the other by rotating valve 19 in one direction or the other, and the distance slide block 7 is moved is determined by the angular distance through which valve 19 is rotated.

Valve 19 may be rotated by a hand lever 26 fixed to the outer end thereof and the distance through which it is rotated may be indicated upon a stationary dial 27 by a pointer 28 fixed for rotation with valve 19. Dial 27 may be graduated to indicate the position of the controlled actuator and the distance through which it is moved in response to rotation of lever 26.

Receiver pump 2 may be provided with a similar DH control the lever of which is operated in response to movement of the controlled actuator but it has been shown as having a mechanical control including a lever 29 which has one end pivoted to the casing of pump 3 and its other end adapted to be operated in response to operation of the controlled actuator, a control pin 30 which is arranged between an intermediate portion of lever 29 and the right side of slide block 8, and a spring 31 which urges slide block 8 toward the right and holds pin 30 in contact with lever 29.

The arrangement is such that, when lever 29 is swung clockwise, it will move pin 30 and slide block 8 toward the left and, when lever 29 is swung counterclockwise, spring 31 will move slide block 8 toward the right.

For the purpose of illustration, the control has been shown in Fig. 1 as being employed to adjust the displacement of a hydrodynamic machine 36 having a displacement varying member or slide block 37. This machine will function as a pump when it is driven mechanically and it will function as a motor when it is supplied with motive liquid. When slide block 37 is in its central or neutral position, the machine is at zero stroke and it will create neither motion nor a flow of liquid. When slide block 37 is shifted in one direction from its neutral position, the machine will deliver liquid in one direction if it is driven mechanically or it will drive its load in one direction if it is supplied with motive liquid. When slide block 37 is shifted in the opposite direction from its neutral position, the machine will deliver liquid in the opposite direction if it is driven mechanically or it will drive its load in the opposite direction if it is supplied with motive liquid.

Slide block 37 is adapted to be moved toward the left by a piston 38 fitted in a stationary cylinder 39 and it is adapted to be moved toward the right by a piston 40 which has the same effective pressure area as piston 38 and is fitted in a stationary cylinder 41. Cylinders 38 and 41 are connected by channels 42 and 43, respectively, to channels 5 and 6 so that a variation in the flow in one of channels 5 and 6 will cause liquid to enter one of cylinders 38 and 41 and the piston therein to move slide block 37 and cause the other piston to eject liquid from its cylinder into the other of channels 5 and 6. Pistons 38 and 40 and cylinders 39 and 41 constitute a hydraulic actuator for moving slide block 37 or any other element to which they may be connected.

Motion is transmitted from slide block 37 to lever 29 through a rod 44 which has been shown connected at one end to piston 40 and its other end in engagement with lever 29 but, in order to avoid the necessity of providing a gland in the head of the cylinder, such rods are ordinarily connected to the slide block and extend through the wall of the pump casing. Rod 44 is of such length that it will cause lever 29 to hold slide block 8 in its neutral position when slide block 37 is in its neutral position.

With the parts in the positions shown and pumps 1 and 3 being driven by motors 2 and 4, slide blocks 7, 8 and 37 are in their neutral positions and gear pump 9 is maintaining pressure in the hydraulic circuit and in cylinders 39 and 41. It is immaterial whether pump 1 discharges liquid into channel 5 or channel 6 in response to movement of slide block 7 in a given direction from its neutral position but, assuming that movement of slide block 7 toward the left from its neutral position will cause pump 1 to discharge liquid into channel 5, the control will function as follows:

When lever 26 is moved from its neutral position a given distance in a clockwise direction in respect to Fig. 3, slide block 7 will be moved toward the left from its neutral position and pump 1 will discharge liquid into channel 5 at a rate determined by the angular distance through which lever 26 is rotated from its neutral position. Since pump 3 is at zero displacement, the liquid cannot enter it and will flow through channel 42 to cylinder 39 and cause piston 38 to move slide block 37 and piston 40 toward the left. Piston 40 will eject liquid from cylinder 41 through channel 43 into channel 6 and rod 44 will swing lever 29 clockwise and cause it to move slide block 8 toward the left until the displacement of pump 3 is equal to the displacement of pump 1 and then pump 3 will draw liquid from channel 5 at the same rate that pump 1 is discharging liquid into channel 5 so that there will be no flow in channel 42 or channel 43 and slide block 7 will come to rest in a position determined by the position of control lever 26. Therefore, dial 27 may be graduated to show in any position of lever 26 the position of slide block 37 or to show the volumetric delivery if machine 36 is functioning as a pump or the speed of the load if machine 36 is functioning as a motor.

If slide block 37 should move from its adjusted position, its movement would be transmitted to lever 29 which would adjust pump 3 to thereby cause slide block 37 to be returned to its adjusted position. For example, if slide block 37 should start to move toward the left, rod 44 would move with it and cause lever 29 to shift slide block 8 toward the left to increase the displacement of pump 3 and thereby cause pump 3 to discharge liquid into channel 6 in excess of the liquid that pump 1 could receive and this excess liquid will flow through channel 43 and cause piston 40 to move slide block 37 toward the right to its adjusted position. As soon as slide block 37 started to move toward the right, spring 31 would move slide block 8 toward the right to reduce the displacement of pump 3 so that, when slide block 37 arrived at its adjusted position, the displacement of pumps 1 and 3 would be equal and there would be no flow in channel 42 or channel 43. Consequently, slide block 37 would stop and be held in its adjusted position.

After slide block 37 has been moved to an adjusted position in response to control lever 26 having been moved clockwise to a given position, further movement of lever 26 in the same direction would cause pump 1 to discharge more liquid into channel 5 than could enter pump 3 and the excess liquid would flow through channel 42 to cylinder 39 and cause piston 38 to move slide block 37 toward the left until it was in the position corresponding to the position of control lever 26 and then it would stop for the reason that rod 44 and lever 29 will have adjusted pump 3 to equalize the flow in the two sides of this circuit as previously explained.

When control lever 26 is moved in a counterclockwise direction in respect to Fig. 3, slide block 7 will move toward the right. If slide block 7 at that time is at the left of its neutral position, pump 3 is discharging liquid into channel 6 and moving slide block 7 toward the right reduces the displacement of pump 1 so that the liquid discharged by pump 3 into channel 6 is in excess of the liquid that can enter pump 1. If slide block 7 at that time is in or at the right of its neutral position, the displacement of pump 3 is zero or equal to the displacement of pump 1 and moving slide block 7 toward the right causes pump 1 to discharge liquid into channel 6 in excess of the liquid that can enter pump 3. In either case, excess liquid is discharged into channel 6 and this excess liquid flows through channel 43 and causes piston 40 to move slide block 37 toward the right. Rod 44 will move with slide block 37 and permit spring 31 to move slide block 8 toward the right until the displacement of pump 3 is the same as the displacement of pump 1, thereby equalizing the flow in the two sides of the circuit and stopping further movement of slide block 37 which is then held in its adjusted position by equal pressures acting upon pistons 38 and 40.

The slightest variation in the flow in one side of the hydraulic circuit relative to the flow in the other side thereof causes slide bock 37 to move substantially instantaneously and, since slide block 8 moves in synchronism with slide block 37, any tendency of slide block 37 to move from an adjusted position is overcome substantially instantaneously and slide block 37 responds almost instantly to movement of control lever 26.

As shown in Fig. 4, the control may be employed to control a plurality of hydraulic actuators such as the displacement varying mechanisms of a plurality of hydrodynamic machines, it being only necessary to associate a receiver pump with each actuator, to connect the transmitter pump and all of the receiver pumps into a closed series circuit, to connect one end of each actuator to one side of the circuit, and to connect the other end of each actuator to the other side of the circuit between the receiver pump associated with that actuator and the adjacent pump in the series.

The control shown in Fig. 4 is the same as the control shown in Fig. 1 except that it includes a second identical receiver pump for controlling a second identical hydrodynamic machine. That is, it includes a transmitter pump 1 which is driven by an electric motor 2, a receiver pump 3 which is driven by an electric motor 4 and is associated with a hydrodynamic machine 36, and a receiver pump 3$^a$ which is driven by an electric motor 4$^a$ and is associated with a hydrodynamic machine 36$^a$.

Pumps 1 and 3 and machine 36 are identical, respectively, to the pumps and machine shown in Fig. 1 and like parts thereof have been indicated by like reference numerals. Pump 3$^a$ and machine 36$^a$ are the same, respectively, as pump 3 and machine 36 and corresponding parts thereof have been indicated by a corresponding reference numeral with the exponent "a" added to the reference numerals applied to pump 3$^a$ and machine 36$^a$.

All of the pumps are connected in series in a closed hydraulic circuit. Pump 1 has one of its ports connected by a channel 5 to one port of pump 3 the other port of which is connected to one port of pump 3$^a$ by a channel 45 and the other port of pump 3$^a$ is connected by a channel 6$^a$ to the other port of pump 1. Channel 5 is connected by a channel 42$^a$ to the cylinder 39 of machine 36 and also to the cylinder 39$^a$ of machine 36$^a$. Channel 45 is connected by a channel 43 to the cylinder 41 of machine 36 and channel 6$^a$ is connected by a channel 43$^a$ to the cylinder 41$^a$ of machine 36$^a$. Additional actuators and receiver pumps may be added in the same way that machine 36$^a$ and pump 3$^a$ are added to the combination shown in Fig. 1.

As previously explained, liquid for operating the displacement varying mechanism of pump 1 is supplied by a gear pump 9 which draws liquid from a reservoir 10 and discharges it into a branched supply channel 11 having connected thereto a relief valve 12 through which liquid discharged by pump 9 in excess of requirements is exhausted. Channel 11 is connected through check valves 13, 14 and 46 to channels 5, 6$^a$ and 45, respectively, to enable gear pump 9 to make up for leakage losses and to maintain pressure in the hydraulic circuit.

The control shown in Fig. 4 operates in the same manner as the control shown in Fig. 1 except that operation of control lever 26 effects operation of two actuators instead of one. For example, when lever 26 is operated to cause pump 1 to discharge more liquid into channel 5 than can enter pump 3, the excess liquid will flow through channel 42ª to cylinders 39 and 39ª and cause pistons 38 and 38ª to move slide blocks 37 and 37ª toward the left. Rods 44 and 44ª will move with slide blocks 37 and 37ª and swing levers 29 and 29ª clockwise to increase the displacements of pumps 3 and 3ª until the flow in the two sides of the circuit is equalized and then slide blocks 37 and 37ª will stop and be held in their adjusted positions.

When lever 26 is operated to cause pump 1 to discharge more liquid into channel 6ª than can enter pump 3ª, the excess liquid will flow through channel 43ª to cylinder 41ª and cause piston 40ª to move slide block 37ª toward the right. Rod 44ª will move with slide block 37ª and permit spring 31ª to move slide block 8ª toward the right and then pump 3ª will discharge more liquid than can enter pump 3 and the excess liquid will flow through channel 43 to cylinder 41 and cause piston 40 to move slide block 37 toward the right. Rod 44 will move with slide block 37 and permit spring 31 to move slide block 8 toward the right to increase the displacement of pump 3. Slide blocks 37 and 37ª will continue to move toward the right and springs 31 and 31ª will continue to adjust pumps 3 and 3ª until the displacements of pumps 3 and 3ª are the same as the displacement of pump 1 and then slide blocks 37 and 37ª will stop and be held in their adjusted positions.

It has previously been stated that the control is employed to control a hydraulic actuator of which pistons 38 and 40 and cylinders 39 and 41 constitute one form. Other forms of actuators may be controlled such as the simple actuator shown in Fig. 5. This form includes a stationary cylinder 50 and a piston 51 which corresponds to pistons 38 and 40 and is fitted in cylinder 50 and divides its interior into pressure chambers 39ᵇ and 41ᵇ corresponding, respectively, to cylinders 39 and 41. A tail rod 52 may be fixed to one end of piston 51 for transmitting motion therefrom to an element which is to be moved to and held in adjusted positions. A rod 44ᵇ corresponding to rod 44 may transmit motion from the other end of piston 51 to lever 29 and channels 42 and 43 may be connected to cylinder 50 in communication with chambers 39ᵇ and 41ᵇ respectively.

The control will operate as described above. That is, a variation in the flow in one side of the circuit relative to the flow in the other side thereof will cause piston 51 to move and transmit its motion to lever 29 and any tendency of piston 51 to move from an adjusted position will cause or permit lever 29 to move and thereby overcome such tendency.

The control described herein is susceptible of various modifications and adaptations without departing from the scope of the invention which is hereby claimed as follows:

1. In a control for a hydraulic actuator, the combination of a transmitter pump, a receiver pump, fluid channels connecting said pumps in a substantially closed circuit, means for varying the displacement of said transmitter pump to vary the rate at which it delivers liquid to said receiver pump, means for adjusting the displacement of said receiver pump, means responsive to a variation in the delivery of one pump relative to the delivery of the other pump for effecting operation of said actuator, and means responsive to operation of said actuator for operating said adjusting means to cause said receiver pump to deliver liquid at the same rate as said transmitter pump and thereby stop further operation of said actuator.

2. In a control for a hydraulic actuator, the combination of a transmitter pump, a receiver pump, fluid channels connecting said pumps in a substantially closed circuit, means for varying the displacement of said transmitter pump to vary the rate at which it delivers liquid to said receiver pump, means for adjusting the displacement of said receiver pump, means responsive to a variation in the delivery of one pump relative to the delivery of the other pump for effecting operation of said actuator, means responsive to operation of said actuator for operating said adjusting means to cause said receiver pump to deliver liquid at the same rate as said transmitter pump and thereby stop further operation of said actuator, and means other than said pumps for maintaining pressure in both sides of said circuit to resist operation of said actuator when the displacement of said pumps are equal.

3. In a control for a hydraulic actuator having piston means fitted in cylinder means and pressure chambers at opposite ends of said piston means, the combination of a transmitter pump, a receiver pump, fluid channels connecting said pumps in a substantially closed circuit, fluid channels connecting said pressure chambers to opposite sides of said circuit respectively, means for varying the displacement of said transmitter pump to vary the flow in one side of said circuit relative to the flow in the other side thereof and thereby effect movement of said piston means, means for adjusting the displacement of said receiver pump, and means responsive to movement of said piston means for operating said adjusting means to vary the displacement of said receiver pump and thereby equalize the flow in the two sides of said circuit.

4. In a control for a hydraulic actuator having piston means fitted in cylinder means and pressure chambers at opposite ends of said piston means, the combination of a transmitter pump, a receiver pump, fluid channels connecting said pumps in a substantially closed circuit, fluid channels connecting said pressure chambers to opposite sides of said circuit respectively, means for varying the displacement of said transmitter pump to vary the flow in one side of said circuit relative to the flow in the other side thereof and thereby effect movement of said piston means, means for adjusting the displacement of said receiver pump, means responsive to movement of said piston means for operating said adjusting means to vary the displacement of said receiver pump and thereby equalize the flow in the two sides of said circuit, and means other than said pumps for maintaining pressure in both sides of said circuit.

5. In a control for a hydraulic actuator having piston means fitted in cylinder means and pressure chambers at opposite ends of said piston means, the combination of a transmitter pump and a receiver pump having identical displacements, means for driving said pumps at the same speed, fluid channels connecting said pumps in a substantially closed circuit, fluid channels connecting said pressure chambers to opposite sides of said circuit respectively, means for adjusting the displacement of said receiver pump, and means responsive to movement of said piston means for operating said adjusting means.

6. In a control for a hydraulic actuator having piston means fitted in cylinder means and pressure chambers at opposite ends of said piston means, the combination of a transmitter pump and a receiver pump having identical displacements, means for driving said pumps at the same speed, fluid channels connecting said pumps in a substantially closed circuit, fluid channels connecting said pressure chambers to opposite sides of said circuit respectively, means for varying the displacement of said transmitter pump to vary the flow in one side of said circuit relative to the flow in the other side thereof and thereby effect movement of said piston means, means for adjusting the displacement of said receiver pump, and means responsive to movement of said piston means for operating said adjusting means to vary the displacement of said receiver pump and thereby equalize the flow in the two sides of said circuit.

7. In a control for a hydraulic actuator having piston means fitted in cylinder means and pressure chambers at opposite ends of said piston means, the combination of a transmitter pump and a receiver pump each having a displacement varying member shiftable in one direction or the other from a neutral position to effect delivery of liquid in one direction or the other, fluid channels connecting said pumps in a substantially closed circuit, fluid channels connecting said pressure chambers to opposite sides of said circuit respectively, means for shifting the displacement varying member of said transmitter pump in one direction or the other to vary the flow in one side of said circuit relative to the flow in the other side of said circuit and thereby effect movement of said piston means, and means responsive to movement of said piston means for shifting the displacement varying member of said receiver pump to thereby equalize the flow in the two sides of said circuit.

8. In a control for a hydraulic actuator having piston means fitted in cylinder means and pressure chambers at opposite ends of said piston means, the combination of a transmitter pump and a receiver pump each having a displacement varying member shiftable in one direction or the other from a neutral position to effect delivery of liquid in one direction or the other, fluid channels connecting said pumps in a substantially closed circuit, fluid channels connecting said pressure chambers to opposite sides of said circuit respectively, means for shifting the displacement varying member of said transmitter pump in one direction or the other to vary the flow in one side of said circuit relative to the flow in the other side of said circuit and thereby effect movement of said piston means, means responsive to movement of said piston means for shifting the displacement varying member of said receiver pump to thereby equalize the flow in the two sides of said circuit, and means other than said pumps for maintaining pressure in both sides of said circuit.

9. In a control for a hydrodynamic machine having a displacement member and piston and cylinder means for shifting said member including pressure chambers arranged at opposite sides of said piston means, the combination of a transmitter pump, a receiver pump, fluid channels connecting said pumps in a substantially closed circuit, fluid channels connecting said pressure chambers to opposite sides of said circuit respectively, means for varying the displacement of said transmitter pump to vary the flow in one side of said circuit relative to the flow in the other side thereof and thereby cause said piston means to shift the displacement varying member of said hydrodynamic machine, means for adjusting the displacement of said receiver pump, and means responsive to movement of said member for operating said adjusting means to vary the displacement of said receiver pump and thereby equalize the flow in the two sides of said circuit.

10. In a control for a hydrodynamic machine having a displacement member and piston and cylinder means for shifting said member including pressure chambers arranged at opposite sides of said piston means, the combination of a transmitter pump, a receiver pump, fluid channels connecting said pumps in a substantially closed circuit, fluid channels connecting said pressure chambers to opposite sides of said circuit respectively, means for varying the displacement of said transmitter pump to vary the flow in one side of said circuit relative to the flow in the other side thereof and thereby cause said piston means to shift the displacement varying member of said hydrodynamic machine, means for adjusting the displacement of said receiver pump, means responsive to movement of said member for operating said adjusting means to vary the displacement of said receiver pump and thereby equalize the flow in the two sides of said circuit, and means other than said pumps for maintaining pressure in both sides of said circuit.

11. In a control for a hydrodynamic machine having a displacement member and piston and cylinder means for shifting said member including pressure chambers arranged at opposite sides of said piston means, the combination of a transmitter pump and a receiver pump having identical displacements, means for driving said pumps at the same speed, fluid channels connecting said pumps in a substantially closed circuit, fluid channels connecting said pressure chambers to opposite sides of said circuit respectively, means for varying the displacement of said transmitter pump to vary the flow in one side of said circuit relative to the flow in the other side thereof and thereby cause said piston means to shift the displacement varying member of said hydrodynamic machine, means for adjusting the displacement of said receiver pump, and means responsive to movement of said member for operating said adjusting means to vary the displacement of said receiver pump and thereby equalize the flow in the two sides of said circuit.

12. In a control for a hydrodynamic machine having a displacement member and piston and cylinder means for shifting said member including pressure chambers arranged at opposite sides of said piston means, the combination of a transmitter pump and a receiver pump each having a displacement varying member shiftable in one direction or the other from a neutral position to effect delivery of liquid in one direction or the other, fluid channels connecting said pumps in a substantially closed circuit, fluid channels connecting said pressure chambers to opposite sides of said circuit respectively, means for shifting the displacement varying member of said transmitter pump in one direction or the other to vary the flow in one side of said circuit relative to the flow in the other side of said circuit and thereby cause said piston means to shift the displacement varying member of said hydrodynamic machine, and means responsive to movement of the displacement varying member of said hydrodynamic machine for shifting the displacement varying member of said receiver pump to thereby equalize the flow in the two sides of said circuit.

13. In a control for a plurality of hydraulic actuators, the combination of a receiver pump associated with each actuator, a transmitter pump, fluid channels connecting said pumps in series in a closed hydraulic circuit, means for varying the displacement of said transmitter pump to vary the rate at which it delivers liquid to said receiver pumps, means responsive to a variation in the delivery of said transmitter pump relative to the delivery of said receiver pumps for effecting operation of said actuators, and means responsive to operation of each actuator for adjusting the displacement of the receiver pump associated with that actuator to cause it to deliver liquid at the same rate as said transmitter pump and thereby stop further operation of that actuator.

14. In a control for a plurality of hydraulic actuators each of which includes piston means fitted in cylinder means and pressure chambers at opposite ends of said piston means, the combination of a receiver pump associated with each actuator, a transmitter pump, fluid channels connecting said pumps in series in a closed hydraulic circuit, a fluid channel connecting one pressure chamber of each actuator to one side of said circuit, a fluid channel connecting the other pressure chamber of each actuator to the other side of said circuit at a point between the receiver pump associated with that actuator and the preceding pump in the series, means for varying the displacement of said transmitter pump to vary the flow in one side of said circuit relative to the flow in the other side thereof and thereby effect operation of said actuators, and means responsive to operation of each actuator for adjusting the displacement of the receiver pump associated with that actuator to cause it to deliver liquid at the same rate as said transmitter pump and thereby stop further operation of that actuator.

15. In a control for a plurality of hydrodynamic machines each having a displacement member and piston and cylinder means for shifting said member including pressure chambers arranged at opposite sides of said piston means, the combination of a receiver pump associated with each hydrodynamic machine, a transmitter pump, fluid channels connecting said pumps in series in a closed hydraulic circuit, a fluid channel connecting one pressure chamber of each machine to one side of said circuit, a fluid channel connecting the other pressure chamber of each machine to the other side of said circuit at a point between the receiver pump associated with that machine and the preceding pump in the series, means for varying the displacement of said transmitter pump to vary the flow in one side of said circuit relative to the flow in the other side thereof and thereby cause said piston means to shift the displacement varying members of said hydrodynamic machines, and means responsive to movement of the displacement member of each machine for adjusting the displacement of the receiver pump associated with that machine to cause it to deliver liquid at the same rate as said transmitter pump and thereby stop further movement of that member.

RANSOM TYLER.